United States Patent [19]

Yonekubo et al.

[11] Patent Number: 5,058,804
[45] Date of Patent: Oct. 22, 1991

[54] AUTOMATIC HOT WATER SUPPLY APPARATUS

[75] Inventors: Hiroaki Yonekubo, Kyoto; Risho Miyoshi; Katsumi Hirata, both of Nara; Munehiko Tokumoto, Nara; Takashi Iwasa, Nara, all of Japan

[73] Assignee: Matsushita Electric Industrial Co., Ltd., Japan

[21] Appl. No.: 403,522

[22] Filed: Sep. 6, 1989

[30] Foreign Application Priority Data

Sep. 6, 1988 [JP] Japan .................................. 63-222725
Sep. 12, 1988 [JP] Japan .................................. 63-228237
Sep. 13, 1988 [JP] Japan .................................. 63-229104
Sep. 14, 1988 [JP] Japan .................................. 63-230437

[51] Int. Cl.$^5$ .............................................. G05D 23/13
[52] U.S. Cl. ........................................ 236/12.12; 4/192
[58] Field of Search ............... 236/12.12, 12.11, 93 B; 364/502; 4/192

[56] References Cited

U.S. PATENT DOCUMENTS

| 3,741,195 | 6/1973 | Ellis | 4/192 X |
| 4,909,435 | 3/1990 | Kidouchi et al. | 236/12.12 |

FOREIGN PATENT DOCUMENTS

| 0184824 | 6/1986 | European Pat. Off. |
| 0299696 | 1/1989 | European Pat. Off. |
| 0306235 | 3/1989 | European Pat. Off. |
| 0320564 | 6/1989 | European Pat. Off. |
| 0344355 | 12/1989 | European Pat. Off. |
| 3430176 | 3/1985 | Fed. Rep. of Germany . |
| 55-9223 | 10/1953 | Japan . |

Primary Examiner—William E. Wayner
Attorney, Agent, or Firm—Lowe, Price, LeBlanc & Becker

[57] ABSTRACT

An automatic hot water supply apparatus produces and supplies hot water by mixing, with a hot water/cold water mixing valve, hot water supplied from an instantaneous water heater unit through a hot water supply pipe and cold water supplied through a cold water supply pipe. The automatic hot water supply apparatus includes a flow rate control valve actuatable by an electric actuator, and a flow rate limiting unit responsive to a hot water temperature setting, or a season setting, or a detected hot water temperature, for varying the flow rate of mixed hot water. The electric actuator is controlled by a signal from the flow rate limiting unit to operate the flow rate control valve in order to solve the problems of a low water temperature during the winter, an excessive hot water flow rate, and a low instantaneous water heater unit capability, so that the automatic hot water supply apparatus can supply hot water at a desired temperature.

7 Claims, 19 Drawing Sheets

FIG. 7

|  | WATER TEMP - 45°C | 47.50°C | HOT WATER TEMP |
|---|---|---|---|
| BATHTUB | 15 ℓ/min | 15 | 8 |
| HAND-HELD SHOWER | 10 | — | — |
| FIXED SHOWER | 10 | — | — |
| WASHING AREA | 10 | — | — |

FIG. 18

PRESET HOT WATER TEMP - COLD WATER TEMP (°C)

| WATER HEATER UNIT CAPACITY | 25 OR BELOW | 26~30 | 31~35 | 36~40 | 41~45 | 46 OR HIGHER |
|---|---|---|---|---|---|---|
| TYPE 16 | ℓ/min 15 | 13 | 11 | 10 | 8 | 6 |
| TYPE 20 | 18 | 16 | 14 | 12 | 11 | 8 |
| TYPE 24 | 20 | 18 | 16 | 15 | 13 | 11 |

FIG. 20

| PRESET HOT WATER TEMP | 30°C OR BELOW | 31~35°C | 36~40°C | 41~45°C | 47.50°C | VERY HOT |
|---|---|---|---|---|---|---|
| INITIAL FLOW RATE | ℓ/min 15 | 13 | 12 | 11 | 10 | 8 |

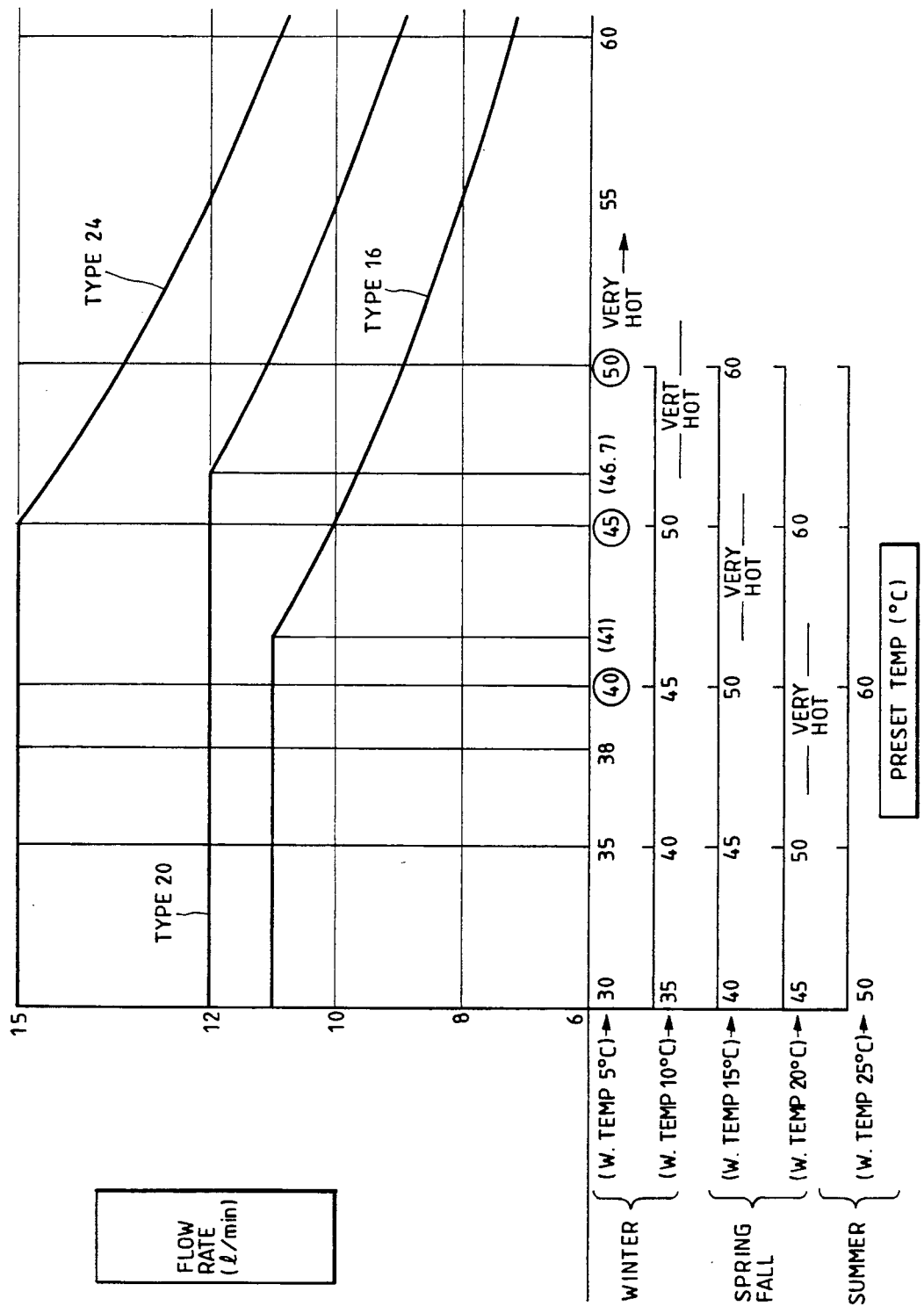

AUTOMATIC HOT WATER SUPPLY APPARATUS

BACKGROUND OF THE INVENTION

The present invention relates to an automatic hot water supply apparatus having a water/hot water mixing valve and a means for preventing the temperature of supplied hot water from being lowered because of the failure of an instantaneous water heater unit to supply a sufficient amount of hot water.

One conventional apparatus using an electrically controlled water/hot water mixing valve for automatically regulating water temperature and supplying hot water is disclosed in Japanese Laid-Open Utility Model Publication No. 55-59223. FIG. 1 of the accompanying drawings illustrates such a known hot water supply apparatus. As shown in FIG. 1, the disclosed hot water supply apparatus includes a valve housing 4 having a hot water inlet 1, a cold water inlet 2, and a mixed hot water outlet 3. The valve housing 4 houses therein a hot water valve 5 and a cold water valve 6 which are fixedly mounted on a shaft 7 rotatably and axially movably supported in the valve housing 4. The shaft 7 is rotated about its own axis by a motor 10 through a screw mechanism 8 and a speed reducer gear mechanism 9, so that the hot water valve 5 and the cold water valve 6 can be axially moved to vary the mixing ratio of hot water to cold water. The temperature of the mixed hot water is detected by a thermistor 11 disposed in the mixed hot water outlet 3. A signal representing the detected temperature and a preset temperature signal set by a temperature setting unit 12 are compared by a controller 13, which then controls the motor 10. The mixed hot water is supplied through a faucet 14 coupled to the mixed hot water outlet 3.

The prior hot water supply apparatus however has suffered the following disadvantages:

(1) The rate at which the mixed hot water is supplied through the faucet 14 must be manually controlled by the faucet 14. Therefore, a desired rate of mixed hot water cannot immediately be achieved.

(2) If an instantaneous water heater unit or a similar water heater unit such as a boiler of a small capacity is used to supply hot water to the hot water inlet 1, then since its ability to heat water is limited, when the faucet 14 is operated to release a large amount of mixed hot water, the temperature of hot water entering the valve housing 4 through the hot water inlet 1 drops lower than the preset temperature set by the temperature setting unit 12. In such an event, even if the hot water valve 5 is fully opened and the cold water valve 6 is fully closed, the temperature of the hot water from the faucet 4 may not reach the desired preset temperature.

SUMMARY OF THE INVENTION

It is an object of the present invention to provide an automatic hot water supply apparatus which can supply hot water at a desired temperature from a cold water/hot water mixing valve even when an instantaneous water heater unit fails to supply a sufficient amount of hot water either in cold days or due to a large outflux of hot water.

According to the present invention, an automatic hot water supply apparatus includes a cold water/hot water mixing valve for mixing cold water and hot water which is supplied from an instantaneous water heater unit, a hot water temperature setting unit for setting a temperature for mixed hot water, a flow rate control valve for controlling the rate of flow of mixed hot water, electric actuator means for actuating the flow rate control valve, flow rate limiting means for preventing the temperature of hot water from dropping due to a failure of the instantaneous water heater unit, and a controller for controlling the electric actuator means to operate the flow rate control valve in response to a signal from the flow rate limiting means.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a table showing the relationship between tap locations, preset hot water temperatures, and hot water flow rates, in the apparatus of the first embodiment;

FIG. 18 is a diagram showing a flow rate control table employed by the flow rate control unit shown in FIG. 17;

FIG. 19 is a graph showing the relationship between instantaneous water heater unit capabilities, hot water temperatures, and hot water flow rates in the apparatus according to the fourth embodiment; and FIG. 20 is a diagram showing a flow rate control table according to another embodiment of the present invention.

DETAILED DESCRIPTION

Figure 1:
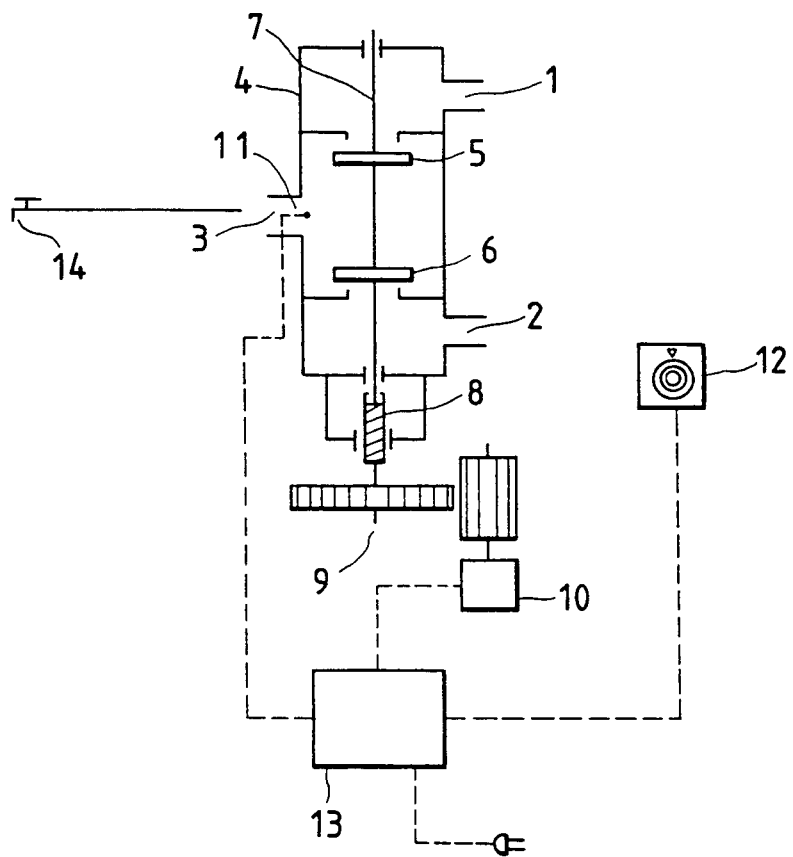
FIG. 1 is a schematic diagram of a conventional automatic hot water supply apparatus

Like or corresponding parts are denoted by like or corresponding reference numerals throughout views.

FIGS. 2 through 9 show an automatic hot water supply apparatus according to a first embodiment of the present invention.

Figure 2:
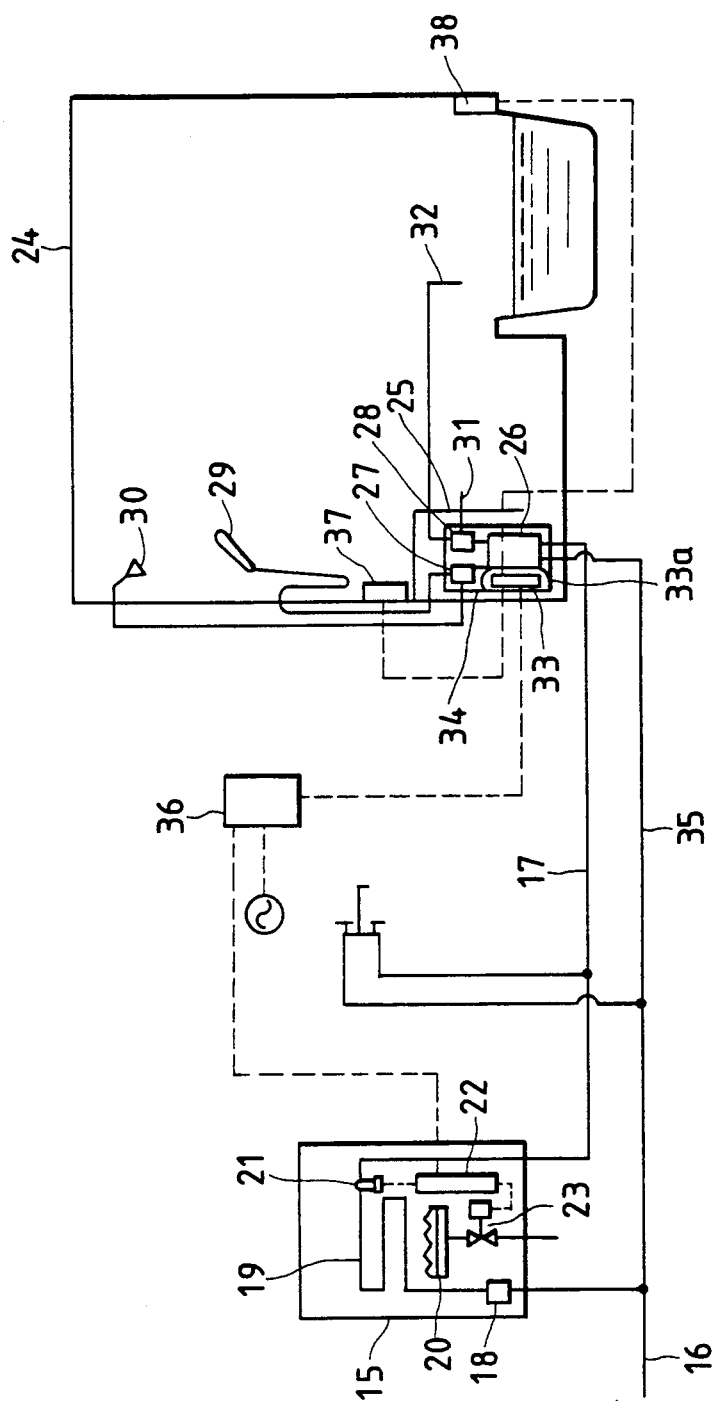
FIG. 2 is a schematic diagram of a hot water supply system incorporating an automatic hot water supply apparatus according to a first embodiment of the present invention.

FIG. 2 shows a hot water supply system which is commonly used also with respect to other embodiments.

As shown in FIG. 2, a gas-burned instantaneous water heater unit 15 is supplied with cold water from a cold water supply pipe 16, and discharges heated hot water through a hot water supply pipe 17. The instantaneous water heater unit 15 has a heat exchanger 19 in which water from a water governor 18 is heated by a burner 20. The temperature of heated water is detected by a thermistor 21. The detected temperature is compared with a preset temperature by a controller 22, which actuates a proportional gas control valve 23 to control the burner 20 so that water will be heated to a desired temperature.

A bathroom 24 has an apron 25 housing therein a mixing valve 26 which is electrically controlled to regulate the temperature of mixed hot water, and a pair of flow rate/directional control valves 27, 28 for controlling the rate of flow of mixed hot water and selectively switching on and off taps or faucets. The flow rate/directional control valve 27 can supply hot water selectively to a hand-held shower 29 and a fixed shower 30, whereas the flow rate/directional control valve 28 can supply hot water selectively to a washing area faucet 31 and a bathtub faucet 32. The mixing valve 26, the flow rate/directional control valves 27, 28, and a controller 33 in the apron 25 jointly serve as an automatic hot water supply unit 34 which is covered with an insulating case for protecting internal electric parts from humidity and water droplets scattered around in the bathroom 24.

The mixing valve 26 is connected to the hot water supply pipe 17 and a water supply pipe 35. The controller 33 and other electric parts are enclosed by a water-resistant case 33a. The controller 33 is electrically connected to a kitchen remote control unit 36, a main remote control unit 37, and a bathtub remote control unit 38.

Figure 3:
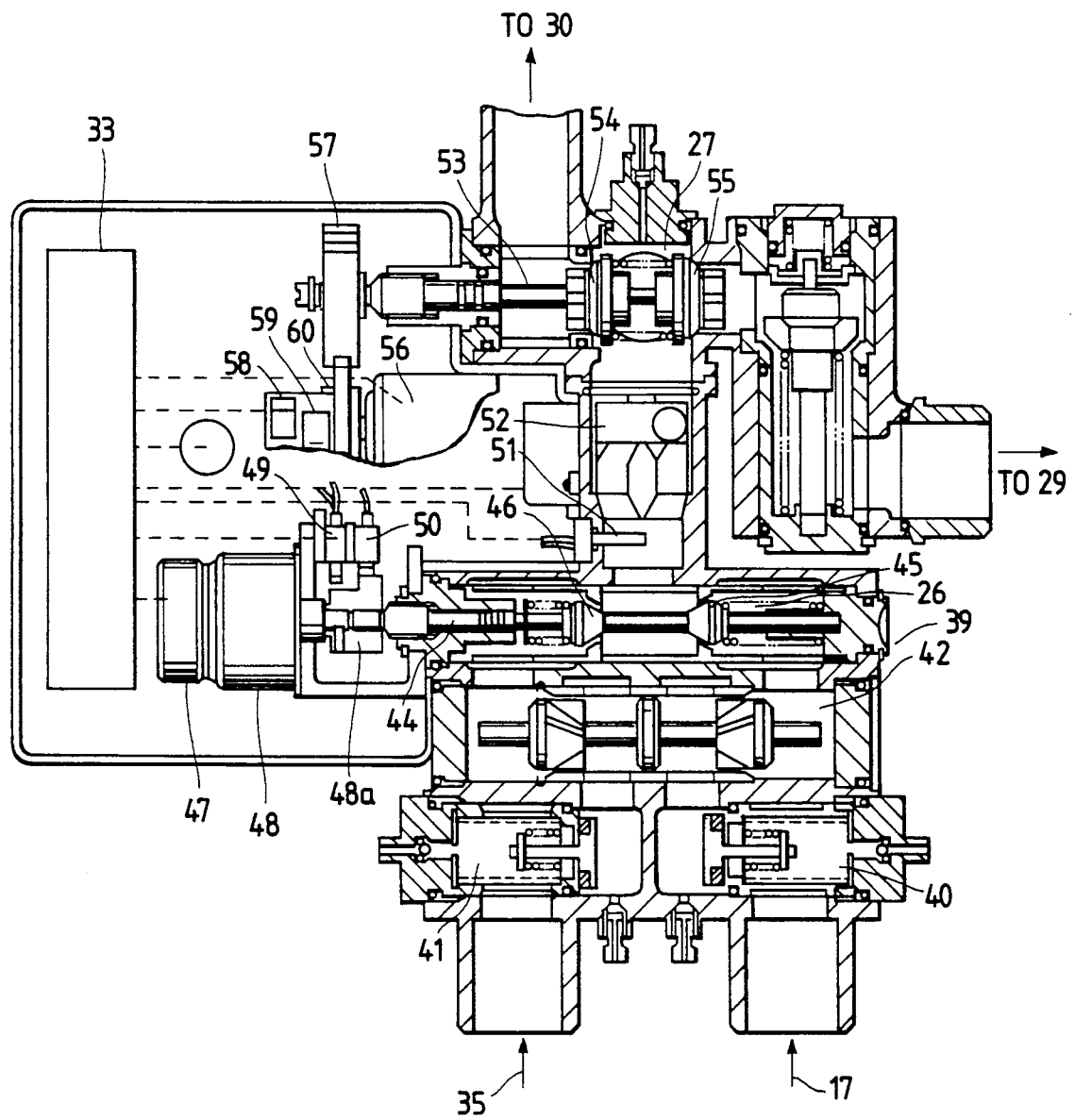
FIG. 3 is a cross-sectional view of an automatic hot water supply unit of the apparatus according to the first embodiment.

FIG. 3 shows the automatic hot water supply unit 34 in greater detail.

Hot water supplied through the hot water supply pipe 17 and cold water supplied through the water supply pipe 35 flow into the mixing valve 26 through respective check valves 40, 41 and a pressure balancing valve 42 for balancing the pressures of hot water and cold water. The mixing valve 26, the check valves 40, 41, and the pressure balancing valve 42 are disposed in a valve housing 39. The mixing valve 26 comprises a hot water valve member 45 and a cold water valve member 46 mounted in spaced-apart relation on a shaft 44. The hot water valve member 45 and the cold water valve member 46 are selectively brought into open and closed positions upon axial movement of the shaft 44. The shaft 44 is axially movable through a screw mechanism associated therewith when it is rotated about its own axis by a stepping motor 47 through a speed reducer gear mechanism 48. Fully closed positions of the hot water valve member 45 and the water valve member 46 can be detected by respective microswitches 49, 50 which are triggerable by a cam 48a mounted on the drive shaft of the stepping motor 48. The temperature of mixed hot water flowing from the mixing valve 26 is detected by a temperature sensor 51 comprising a thermistor, and the flow rate of such mixed hot water is detected by a flow rate sensor 52. The temperature sensor 51 and the flow rate sensor 52 are positioned in the valve housing 39 downstream of the mixing valve 26. The mixed hot water from the mixing valve 26 is directed by the flow rate/directional control valve 27 to either the hand-held shower 29 or the fixed shower 30. The flow rate/directional control valve 27 comprises a pair of valve members 54, 55 mounted on a shaft 53. The shaft 53 is axially movable to move the valve members 54, 55 into open and closed positions. Rotation of a DC motor 56 is transmitted through a gear 57 to the shaft 53 which is axially moved by a screw mechanism associated therewith. A water shutoff position, and fully open positions of the hand-held shower 29 and the fixed shower 30 are detected by microswitches 58, 59, 60 associated with the motor 56.

Although not shown in FIG. 3, the flow rate/directional control valve 28 is positioned adjacent and connected to the flow rate/directional control valve 27 so that the valve 28 can be supplied with mixed hot water from the mixing valve 26. The flow rate/directional control valve 28 is controlled by a DC motor 56' (see FIG. 6) which is identical to the DC motor 56 (FIG. 3). The flow rate sensor 52 therefore can detect the flow rate of how water supplied to both the flow rate/directional control valves 27, 28.

Figure 4:
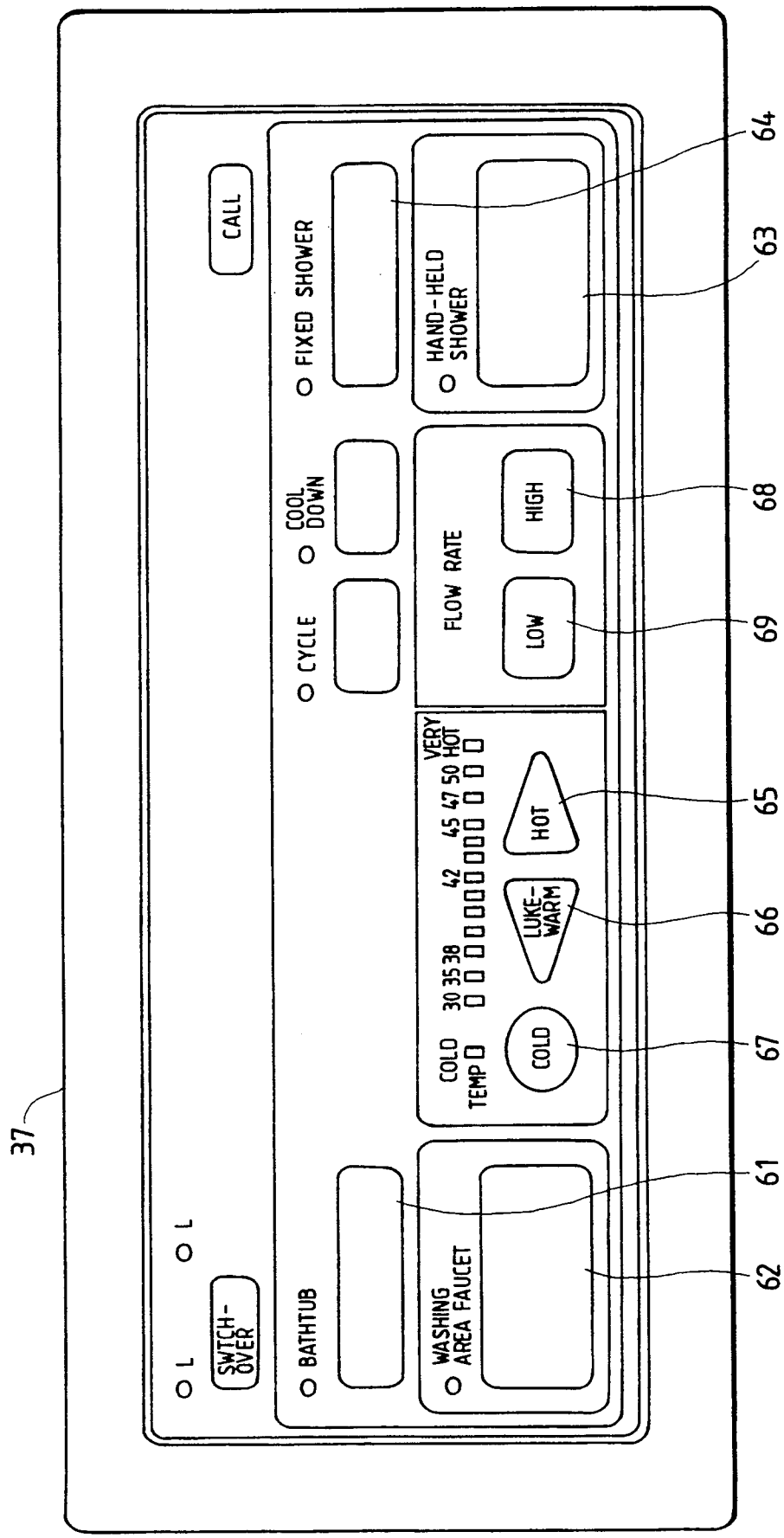
FIG. 4 is a front elevational view of a main remote control unit of the apparatus of the first embodiment.

FIG. 4 shows the main remote control unit 37 in detail. The main remote control unit 37 has a bathtub switch 61, a washing area faucet switch 62, a hand-held shower switch 63, and a fixed shower switch 64, which serve as a tap location setting unit for indicating tap locations to which hot water is to be supplied. The main remote control unit 37 also has a hot water switch 65, a lukewarm water switch 66, and a cold water switch 67, which serve as o part of a hot water temperature setting unit, and a high rate switch 68 and a low rate switch 69, which serve as a flow rate setting unit. The main remote control unit 37 also has other indicator lamps L.

Figure 5:
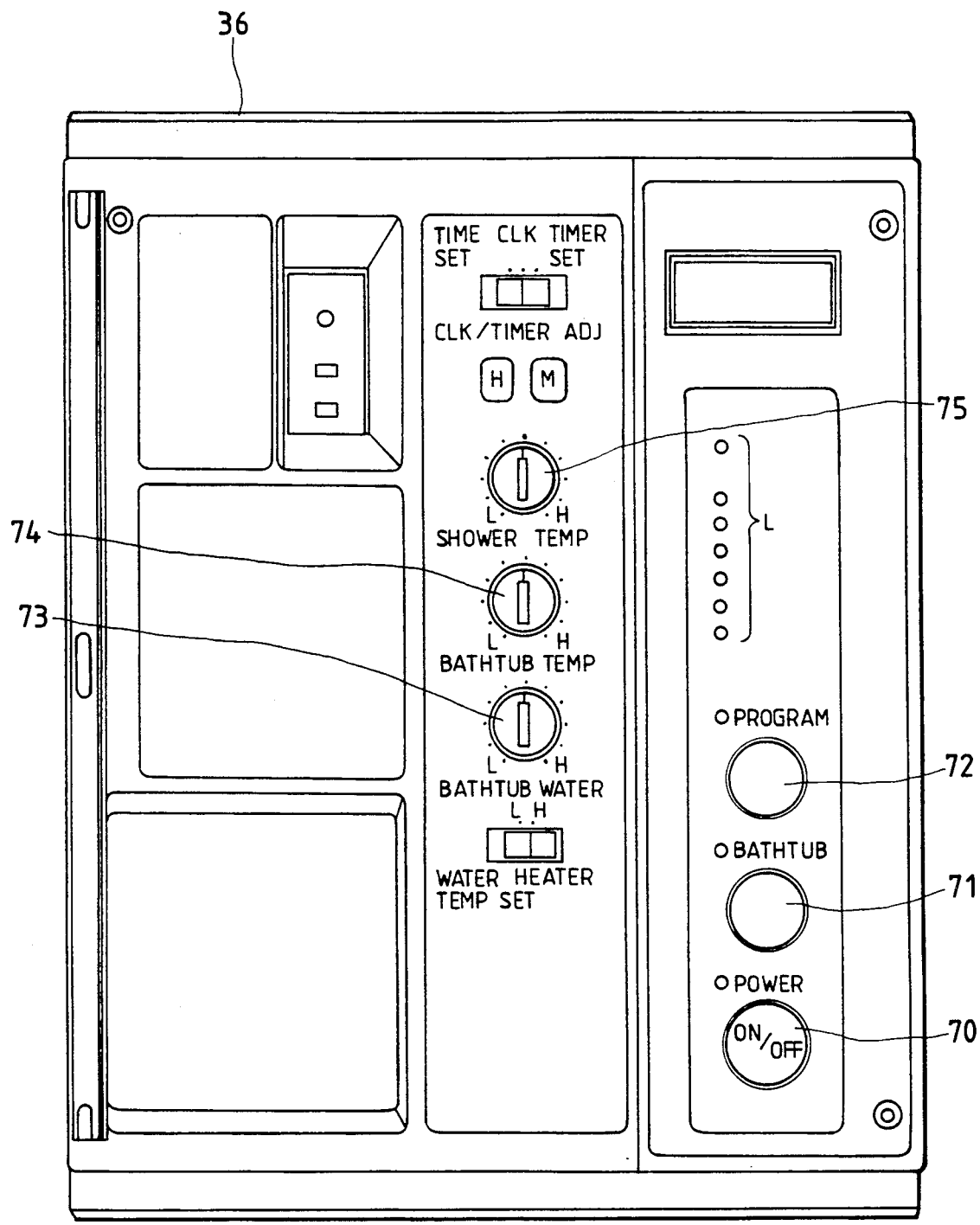
FIG. 5 is a front elevational view of a kitchen remote control unit of the apparatus of the first embodiment.

The kitchen remote control unit 36 is shown in detail in FIG. 5. The kitchen remote control unit 36 has a power supply on/off switch 70, a bathtub switch 71 for instructing the supply of hot water to the bathtub, a program key 72 for presetting a timer-activated or telephone-controlled hot water supply operation, a hot water amount setting knob 73 for setting an amount of hot water to be supplied to the bathtub, a bathtub temperature setting knob 74 for setting a temperature for hot water to be supplied to the bathtub, the bathtub temperature setting knob 74 serving as part of the hot water temperature setting unit, and a shower temperature setting knob 75 for setting a temperature for hot water to be supplied to the showers, the shower temperature setting knob 75 also serving as part of the hot water temperature setting unit. The kitchen remote control unit 36 also has other indicator lamps L.

Figure 6:
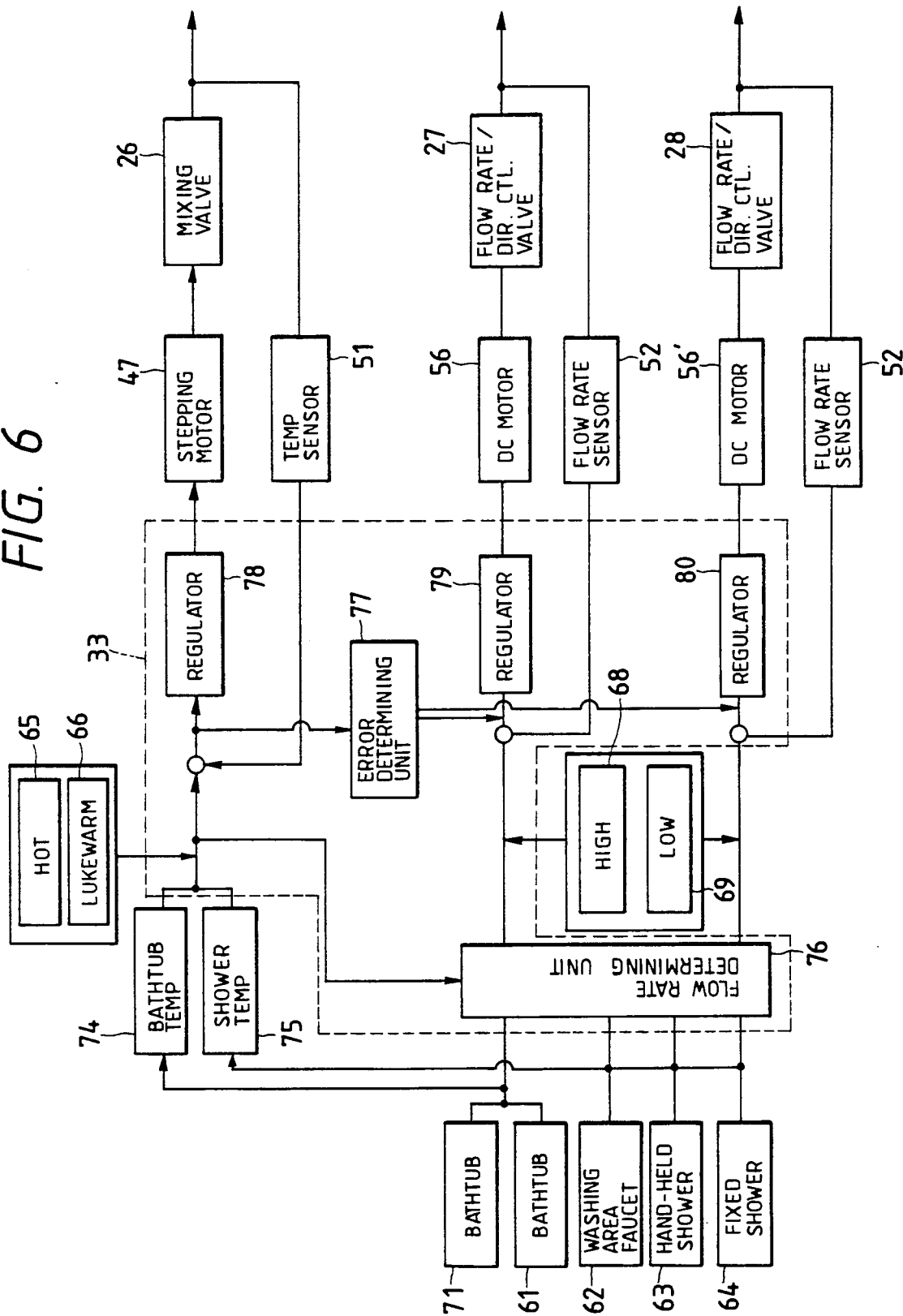
FIG. 6 is a block diagram of a control system of the apparatus according to the first embodiment.

FIG. 6 shows a control system for the automatic hot water supply apparatus according to the first embodiment of the present invention. The controller 33 includes a flow rate determining unit 76 having a flow rate memory, an error determining unit 77 for determining whether a temperature difference is eliminated within a predetermined period of time and for instructing an interrupt command to regulate the flow rate when the temperature difference is not eliminated in the predetermined period of time, and regulators 78, 79, 80 for controlling the operation of the motors 47, 56, 56'.

The automatic hot water supply apparatus according to the first embodiment operates as follows:

When the power supply on/off switch 70 on the kitchen remote control unit 36 is turned on, the automatic hot water supply unit 34 and the instantaneous water heating unit 15 are energized in readiness for operation. One of the bathtub switch 61, the washing area faucet switch 62, the hand-held shower switch 63, and the fixed shower switch 64, which indicate a tap location where hot water is to be supplied and also start and stop the supply of hot water, is depressed to start supplying hot water to a desired tap location at an instructed flow rate and temperature. The flow rate of hot water which is supplied at this time is determined in advance according to the selected tap location and the preset temperature as shown in FIG. 7. More specifically, when the bathtub switch 61 is depressed, hot water is supplied to the bathtub at a rate of 15 liters/min. if the preset temperature ranges from a water temperature to 50° C., and at a rate of 8 liters/min. if the preset temperature indicates very hot water. If the bathtub is to be sup plied with hot water, it should normally be filled with hot water within a short period of time. In view of this, the bathtub is supplied with hot water at the high rate of 15 liters/min. in the hot water temperature range of from 38° C. to 50° C. which is normally selected by the bathtub temperature setting knob 74. The hot water temperature which has been set by the bathtub hot water temperature knob 74 may be varied from within the bathroom 24 by depressing either the hot water switch 65 or the lukewarm water switch 66 on the main remote control unit 37. Through the main remote control unit 37, the hot water temperature may be changed to the range of from 38° C. to 50° C., 35° C., 30° C., the water temperature, and the very hot water temperature. Hot water is supplied at the rate of 15 liters/min. at the temperatures of 38° C. to 50° C., 35° C., 30° C., and the water temperature, since no danger will be caused at these temperatures. However, if very hot water were supplied at a high rate, it would be scattered around due to the separation of air therefrom, and dangerous to the user. To avoid such a danger, very hot water is supplied at the rate of 8 liters/min. Very hot water is also supplied at this rate in order to solve the problem of the failure of the instantaneous water heating unit 15 to supply hot water at a high rate.

Hot water is supplied to the hand-held shower 29, the fixed shower 30, and the washing area faucet 31 uniformly at a rate of 10 liters/min. in the temperature range of from the water temperature to 45° C., as shown in FIG. 7. When either one of the washing area faucet switch 62, the hand-held shower switch 63, and the fixed shower switch 64 is depressed, hot water is supplied at the rate of 10 liters/min. initially at a temperature typically set by the shower temperature setting knob 75 on the kitchen remote control unit 36, the temperature being set in a range from 38° C. to 45° C. After hot water has thus initially been supplied, the temperature of hot water can be changed, by depressing the hot water switch 65 or the lukewarm water switch 66, to the temperature range from 38° C. to 45° C., 35° C., 30° C., and the water temperature. Even if temperature settings of 47° C., 50° C., and the very hot water temperature are selected, they are ignored, and the maximum temperature is kept at 45° C. or below. The showers 29, 30 and the washing area faucet 31 are supplied with hot water at the rate of 10 liters/min. for the reason that this rate is an average rate determined from an investigation of actual rates selected by various users and hot water can initially be supplied at this rate to the satisfaction of many users without substantially rate changes. Thereafter, if the rate of supply of hot water is to be increased regardless of the incapability of the instantaneous water heater unit 15, or if the rate of supply of hot water is to be reduced, then it can be changed in increments or decrements in the range of from 15 liters/min. to 6 liters/min., i.e., to 15 liters/min., 12 liters/min., 10 liters/min., 8 liters/min. and 6 liters/min. by depressing the high rate switch 68 or the low rate switch 69. Each time the high rate switch 68 or the low rate switch 69 is depressed, the flow rate is incremented or decremented by one flow rate step. When the high rate switch 68 or the low rate switch 69 is continuously depressed, the flow rate is automatically incremented or decremented through the range of flow rate steps.

During the winter or when another tap or faucet is used, the instantaneous water heater unit 15 may fail to supply a sufficient amount of hot water. When this happens, the temperature detected by the thermistor temperature sensor 51 and the preset temperature are compared by the controller 33. If the temperature difference is not eliminated within one minute, then the controller 33 actuates the flow rate/ directional control valve 27 or 28 to reduce the flow rate.

For example, if the instantaneous water heater unit 15 fails to supply a sufficient amount of hot water while the bathtub is being supplied with hot water, then the rate of flow of the hot water is reduced from the initial rate of 15 liters/min. to a rate of 12 liters/min. If the temperature difference is not eliminated after the hot water has been supplied at the rate of 12 liters/min. in a prescribed period of time, the rate is further reduced to a lower rate. The reduction of the flow rate is stopped when the temperature difference is eliminated. However, if the temperature difference is not eliminated, then the flow rate is reduced down to a rate of 6 liters/min. If the temperature difference still remains upon elapse of one minute after the rate of 6 liters/min. has been sustained, then the controller 33 determines that the instantaneous water heater unit 15 cannot supply hot water because of an ignition failure or a gas valve closure. The controller 3 then stops hot water supplying operation and displays a corresponding indication on the kitchen remote control unit 36. The above process is mainly carried out by the error determining unit 77.

Figure 8:
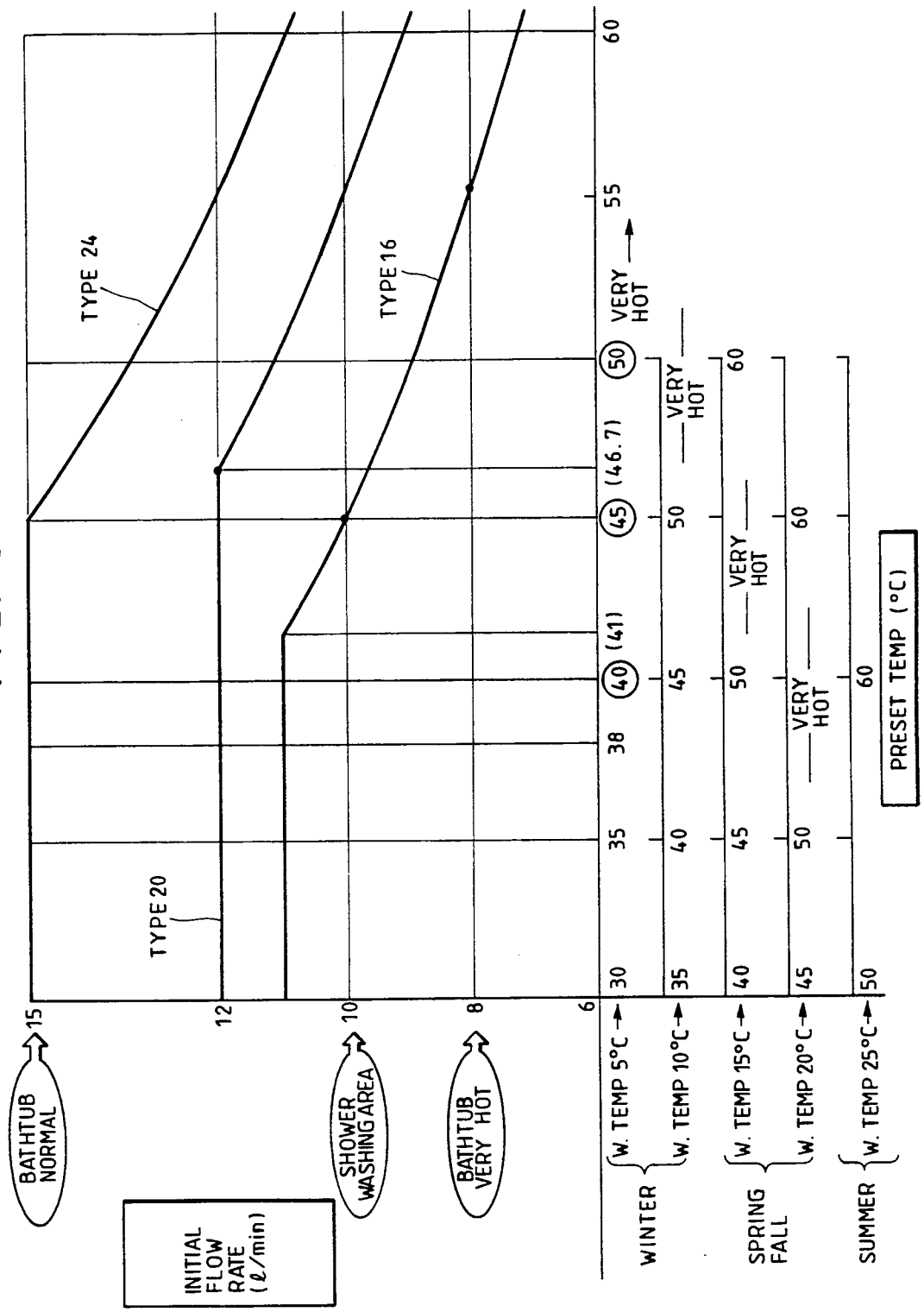
FIG. 8 is a graph showing the relationship between instantaneous water heater unit capabilities, hot water temperatures, and hot water flow rates in the apparatus of the first embodiment.

The incapabilities of various types of the instantaneous water heater unit 15 to supply hot water at certain rates are illustrated in FIG. 8.

The hot water supplying capability required of an instantaneous water heater unit is defined by:

$$\text{Constant} \times \text{Flow rate} \times (\text{Hot water temperature} - \text{Water temperature})$$

When a Type 16 instantaneous water heater unit 15 (which has the capacity of 24000 Kcal/hour) is used, if a preset hot water temperature is to be achieved during the winter, then the initial rate of flow of hot water to be supplied is controlled in the manner described above. The automatic process of reducing the flow rate, as described above, to achieve a desired hot water temperature is particularly effective in supplying hot water to the bathtub while the bathtub is not being attended by any person. At the time the integrated amount of hot water supplied to the bathtub reaches a predetermined level and the flow rate/directional control valve 28 is closed to cut off the hot water, the bathtub has been filled up with hot water at the preset temperature.

When the flow rate is to be reduced, the controller 33 first determines that the preset temperature as detected by the temperature sensor 51 cannot be achieved even when the hot water valve member 45 of the mixing valve 26 is fully opened and the cold water valve member 46 is fully closed. Then, the controller 33 reduces the flow rate after having confirmed the fully open condition of the hot water valve member 45 with the microswitch 49. If use of the other tap is stopped and the temperature of the supplied hot water is increased, then the controller 33 controls the mixing valve 26 to start mixing hot water and cold water. At this time, the controller 33 may increase the flow rate again on the condition that the hot water valve member 45 is not fully open as detected by the microswitch 49.

The flow rate/directional control valves 27, 28 operate to select tap locations on an alternative basis. Therefore, they get rid of control complications which would otherwise be required to meet different demands for the temperature of hot water to be supplied simultaneously to different tap locations, and also prevent simultaneous supply of very hot water to different tap locations. Furthermore, the problem of selecting which valve is to be operated when the flow rate is reduced is eliminated, so that these valves 27, 28 can be operated adequately. Each of the valves 27, 28 is simple in structure since it can stop the supply of water, regulate the rate of flow of water, and change the direction of flow of water.

Figure 9:
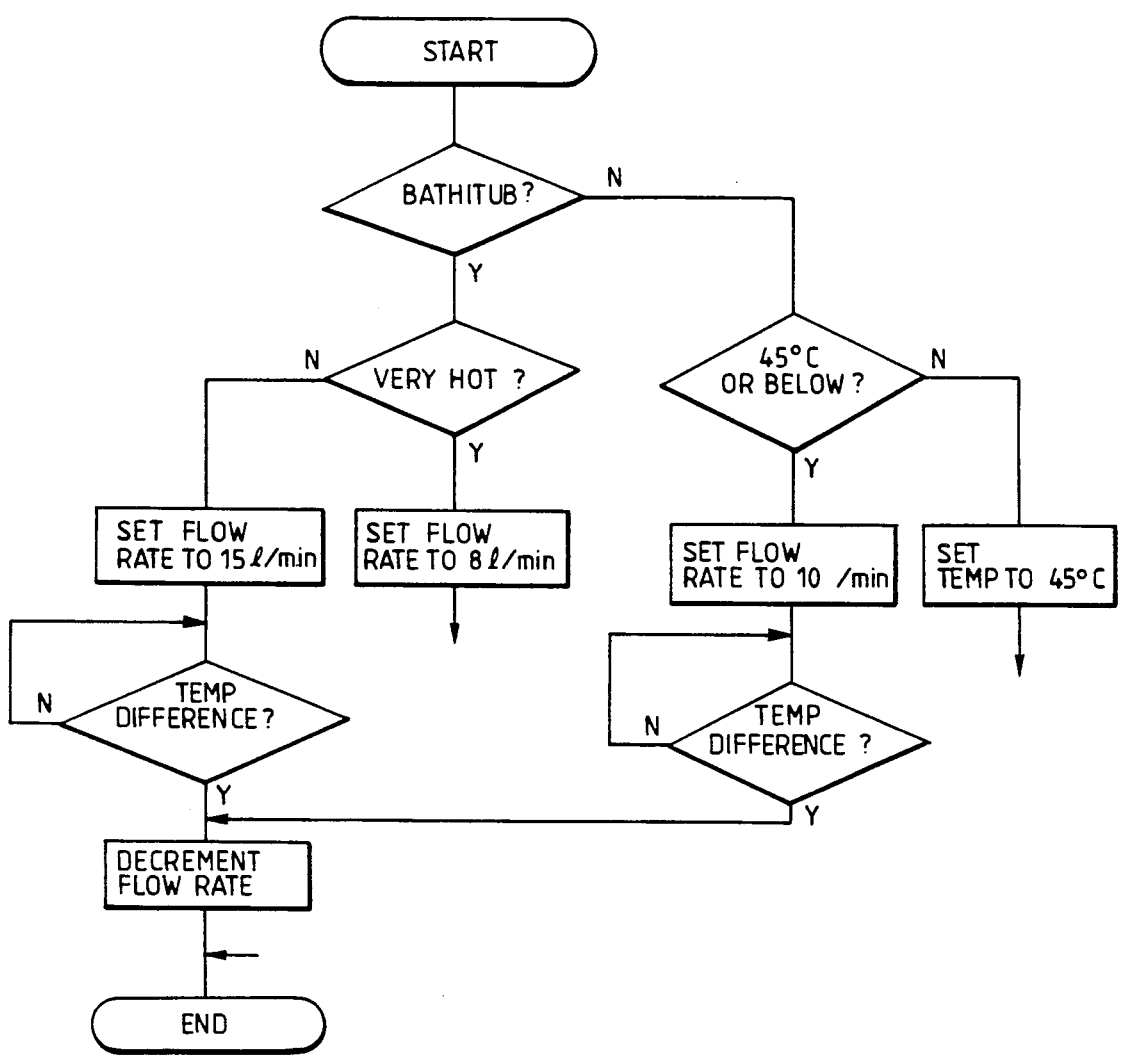
FIG. 9 is a flowchart of a control sequence of the apparatus according to the first embodiment.

FIG. 9 is a flowchart of a sequence according to which the control system shown in FIG. 6 operates to control the automatic hot water supply apparatus shown in FIG. 2

With the automatic hot water supply apparatus according to the first embodiment of the present invention, the supply of hot water to the various tap locations is effected at different flow rates in response to operation of the bathtub switch 61, the washing area faucet switch 62, the hand-held shower switch 63, and the fixed shower switch 64, which serve as the tap location setting unit, the hot water switch 65, the lukewarm water switch 66, and the cold water switch 67, which serve as part of the hot water temperature setting unit, and the bathtub temperature setting knob 74 and the shower temperature setting knob 75. Consequently, hot water can be supplied to the different tap locations at different initial flow rates. Proper flow rates can immediately be accomplished without manual flow rate regulation.

Should the instantaneous water heater unit 15 fail to supply a sufficient amount of hot water, the rate of flow of hot water to be supplied to a selected tap location is reduced to keep the hot water temperature at a preset temperature level. This is particularly advantageous when the bathtub is to be filled up with hot water at a preset temperature.

Figure 10:
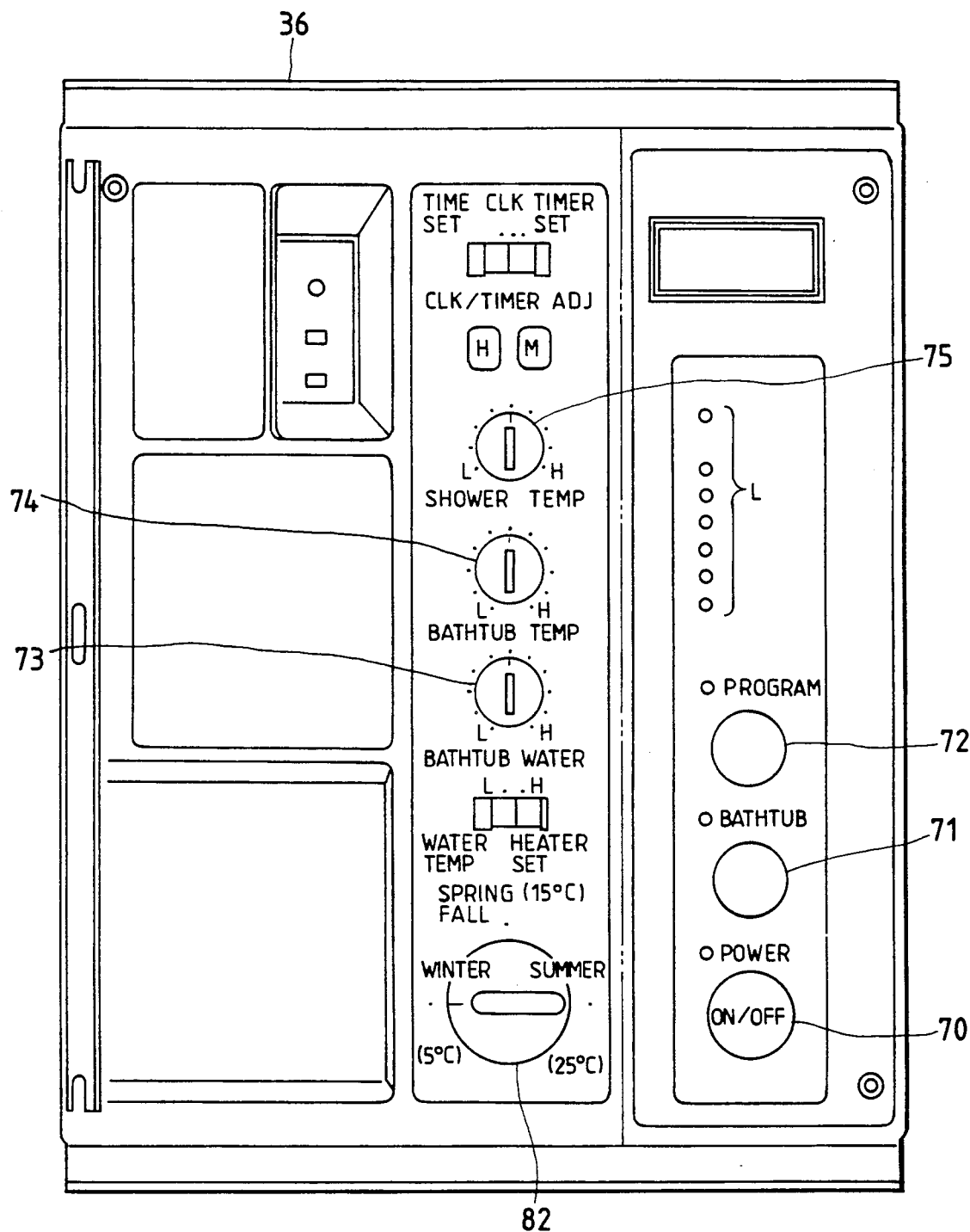
FIG. 10 is a front elevational view of a kitchen remote control unit of an automatic hot water supply apparatus according to a second embodiment of the present invention.
Figure 11:
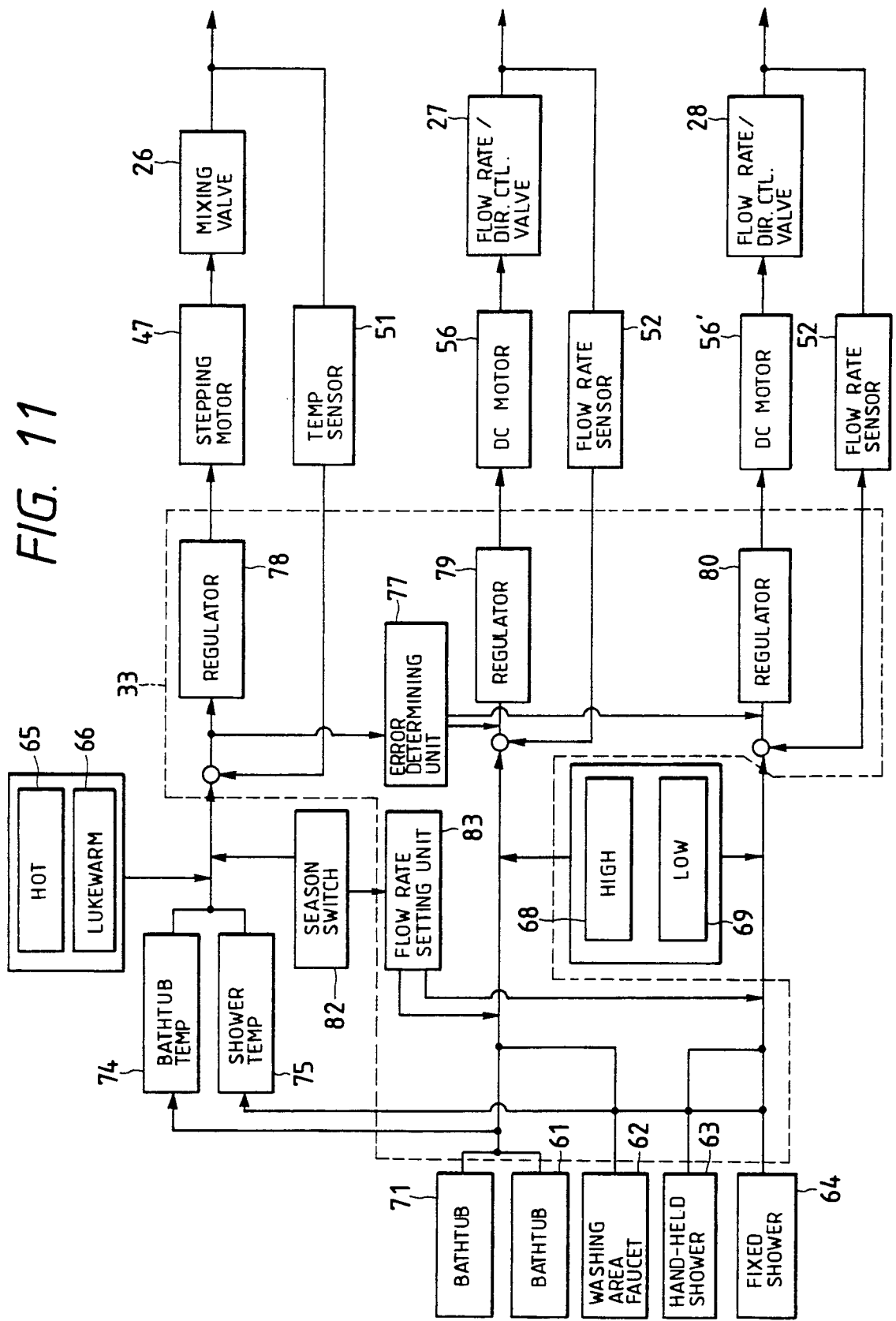
FIG. 11 is a block diagram of a control system of the apparatus of the second embodiment.
Figure 12:
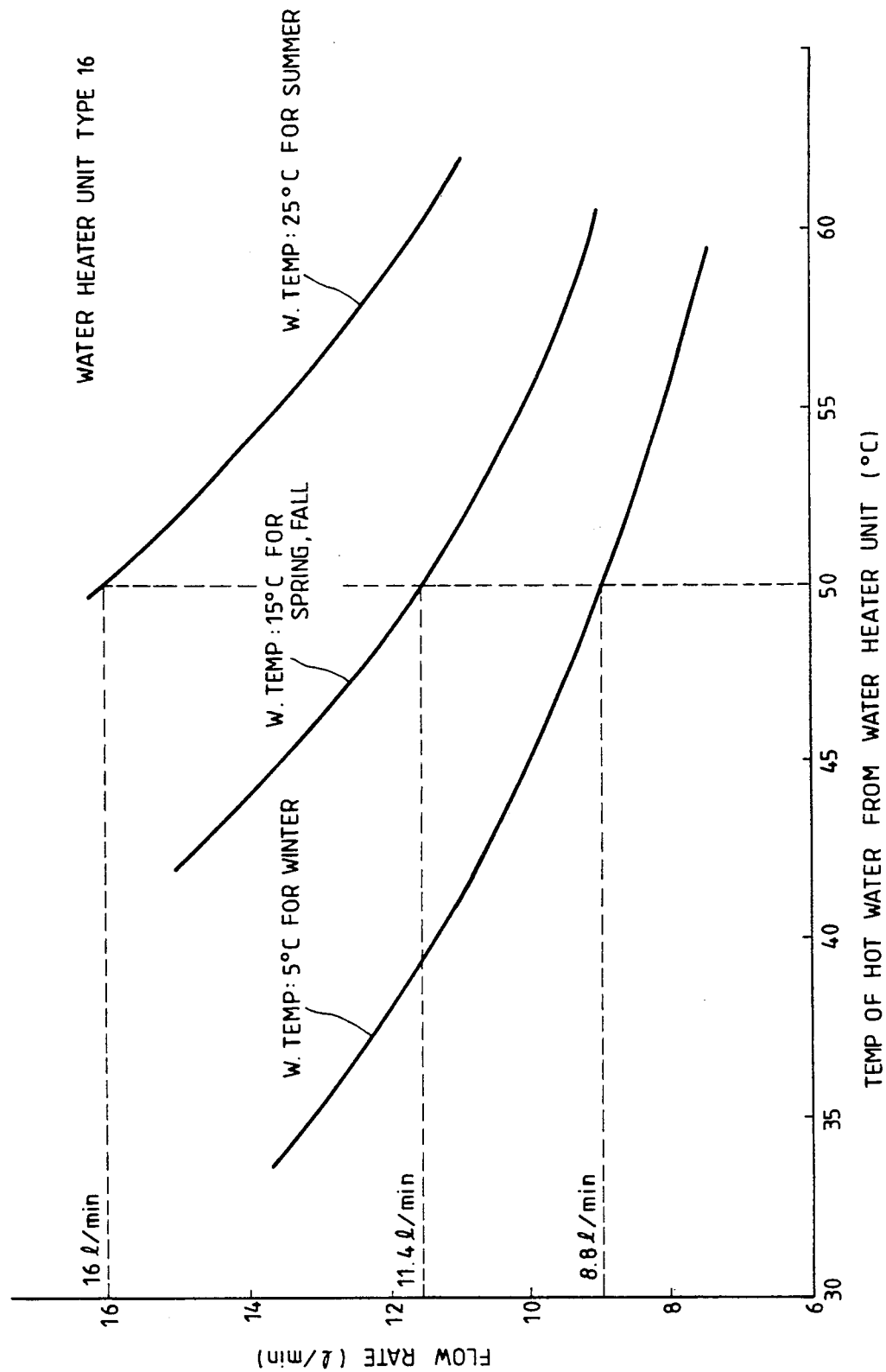
FIG. 12 is a graph showing the relationship between an instantaneous water heater unit capability, hot water temperatures, and hot water flow rates.

FIGS. 10 through 12 show an automatic hot water supply apparatus according to a second embodiment of the present invention.

FIG. 10 shows a kitchen remote control unit 36 of the automatic hot water supply apparatus according to the second embodiment. The kitchen remote control unit 36 has a power supply on/off switch 70, a bathtub switch 71 for instructing the supply of hot water to the bathtub, a program key 72 for presetting a timer-activated or telephone-controlled hot water supply operation, a hot water amount setting knob 73 for setting an amount of hot water to be supplied to the bathtub, a bathtub temperature setting knob 74 for setting a temperature for hot water to be supplied to the bathtub, the bathtub temperature setting knob 74 serving as part of a hot water temperature setting unit, a shower temperature setting knob 75 for setting a temperature for hot water to be supplied to the showers, the shower temperature setting knob 75 also serving as part of the hot water temperature setting unit, and a season switch 82 for setting a season. The user turns the season switch 82 to point its indicator toward the indication of the present season. The indications of the seasons are accompanied by standard water temperatures for those seasons.

FIG. 11 illustrates a control system of the automatic hot water supply apparatus according to the second embodiment of the present invention. The controller 33 includes, in addition to those shown in FIG. 6, a flow rate setting unit 83 for setting a flow rate depending on the season setting of the season switch 82. The controller 33 does not include the flow rate determining unit 76 shown in FIG. 6, but includes a unit for biasing a preset hot water temperature in response to the season setting selected by the season switch 82, and a unit for comparing temperatures and flow rates.

Operation of the automatic hot water supply apparatus of the second embodiment is as follows:

One of the bathtub switch 61, the washing area faucet switch 62, the hand-held shower switch 63, and the fixed shower switch 64 is depressed to start supplying hot water to a desired tap location at an instructed flow rate and temperature. The flow rate of hot water which is supplied at this time is determined based on the graph shown in FIG. 12.

FIG. 12 shows the relationship between the temperature of hot water produced by a Type 16 instantaneous water heater unit (which has the relatively small capacity of 24000 Kcal/hour) and the rate at which the hot water is supplied, with respect to different temperatures of cold water supplied to the instantaneous water heater unit. It can be seen from FIG. 12 that when the temperature of water supplied to the instantaneous water heater unit is lower, it is unable to produce hotter water unless the rate of flow from the water heater unit is lower. For example, if mixed hot water at a temperature of 50° C. or higher is to be supplied from the mixing valve 26, then he flow rate should be 8.8 liters/min. or below when the temperature of water supplied to the water heater unit is low during the winter. The flow rate may be 11.4 liters/min. or below during the spring or fall, and may be 16 liters/min. during the summer. According to the second embodiment, in view of the heat radiation loss of the piping, the flow rate is selected to be 8 liters/min. during the winter, 11 liters/min. during the spring or fall, and 15 liters/min. during the summer. The above flow rates are used when supplying hot water to the bathtub. Hot water may be supplied to the hand-held shower 29, the fixed shower 30, and the washing area faucet 31, which discharge hot water at 45° C. or less, at the flow rates of 9 liters/min. during the winter, 12 liters/min. during the spring or fall, and 16 liters/min. during the summer, for example.

If the rate of supply of hot water is to be increased regardless of the incapability of the instantaneous water heater unit 15, or if the rate of supply of hot water is to be reduced, then it can be changed in increments or decrements by the high rate switch 68 or the low rate switch 69. The actual cold water temperature may be lower than the temperature set by the season switch 82, or the actual flow rate may be higher than expected due to the manufacturing error of the hot water supply apparatus. In view of this, the preset hot water temperature and the actual hot water temperature detected by the temperature sensor 51 are compared by the error determining unit 77. If the temperature difference is not eliminated within a predetermined period of time, then the flow rate is reduced by 1 liter/min. If the temperature difference still remains after another predetermined period of time, then the flow rate is reduced again by 1 liter/min. If the temperature difference is not eliminated even when the minimum flow rate of 6 liters/min. is reached, the controller 33 determines that the instantaneous water heater unit 1 fails to supply hot water, and stops the supply of hot water.

The temperature of mixed hot water is regulated by the bathtub temperature setting unit 74 or the shower temperature setting unit 75, but may be varied by the hot water switch 65 or the lukewarm water switch 66. In addition, the season switch 82 automatically adds 1° C., for example, to the temperature of mixed hot water during the winter, and automatically subtracts 1° C., for example, from the temperature of mixed hot water during the summer. It is also possible to add 3° C. to the temperature of hot water supplied to the bathtub during the winter since the hot water in the bathtub tends to cool off soon during the winter.

The relationship between the hot water supplying capability required of an instantaneous water heater unit, the temperature of water supplied to the water heater unit, the temperature of hot water supplied from the water heater unit, and the flow rate at which hot water is supplied from the water heater unit, is given by:

The hot water supplying capability =

Proportionality constant × Flow rate ×

(Hot water temperature − Water temperature)

The flow rate cannot accurately be determined unless the other three parameters are known. According to the present invention, the flow rate can be determined based on one condition, which is the season that the user can recognize very well, more accurately than would be if no information were available at all.

The flow rate may also be determined from one condition, i.e., the hot water supplying capability or the hot water temperature (which is the same as the temperature of hot water discharged from the mixing valve with the hot water valve member thereof being fully opened), or from two out of the three conditions or parameters referred to above, or from all the three parameters. These conditions or parameters may be manually determined and set, or may be measured by sensors.

The process of using a signal from the season switch 82 which indicates the cold water temperature and a signal from the hot water temperature setting unit which sets a temperature for hot water discharged from the mixing valve 26, is a practical way of determining the flow rate more accurately. Employing the signal from the hot water temperature setting unit is more effective in making the arrangement simple than would be if a water heater unit capability switch provided only for setting flow rates were used.

With the second embodiment, as described above, hot water can be supplied at a suitable flow rate according to the season switch 82, which serves as a season setting unit, and the flow rate can automatically be controlled by the flow control valve actuated by the electric actuator means. Therefore, the operation of the hot water supply apparatus is simple, and the time required to regulate the flow rate and the hot water during the regulating process are prevented from being wasted, so that hot water can be supplied at a desired temperature. The flow rate can be controlled highly accurately, without structural complications, according to the parameter preset by the season setting unit and the parameter preset by the hot water temperature setting unit.

Figure 13:
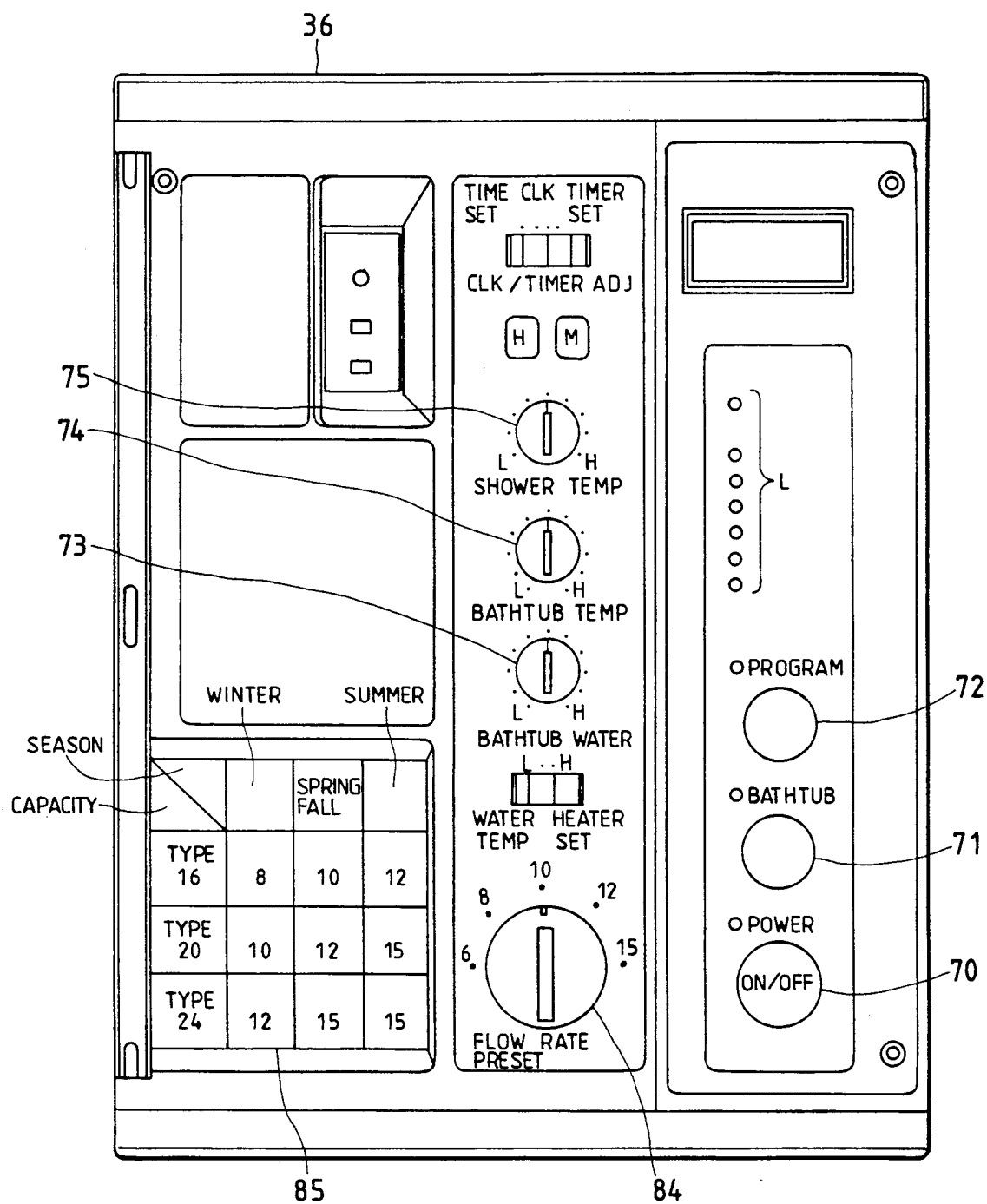
FIG. 13 is a front elevational view of a kitchen remote control unit of an automatic hot water supply apparatus according to a third embodiment of the present invention.
Figure 14:
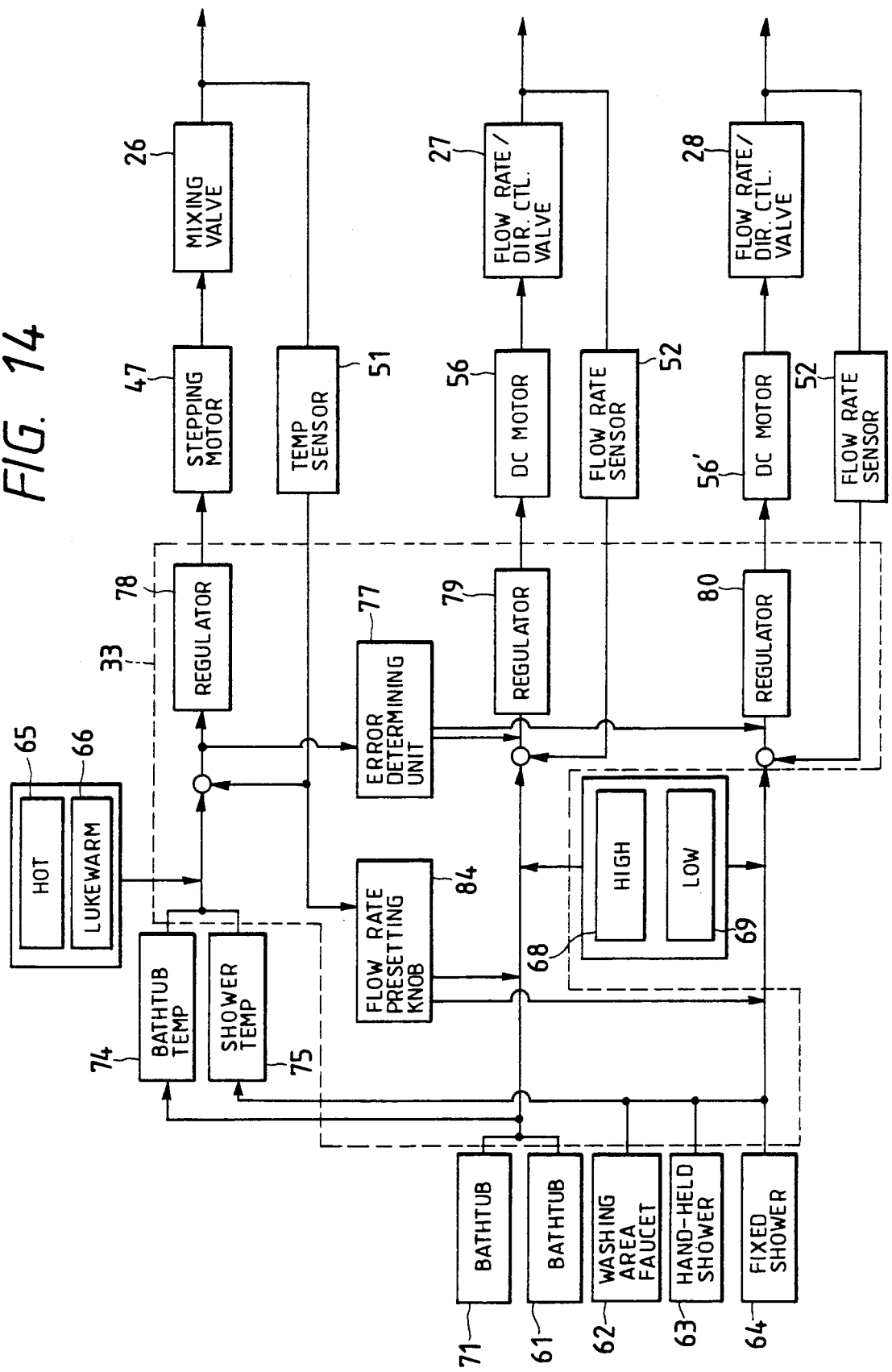
FIG. 14 is a block diagram of a control system of the apparatus of the third embodiment.

FIGS. 13 and 14 illustrate an automatic hot water supply apparatus according to a third embodiment of the present invention. FIG. 13 shows a kitchen remote control unit 36 of the third embodiment. The kitchen remote control unit 36 differs from those of the first and second embodiments in that it contains a flow rate presetting knob 84 for presetting a flow rate for hot water to be supplied from the flow rate/directional control valves 27, 28. The flow rate presetting knob 84 can select five flow rates, i.e., 6 liters/min., 8 liters/min., 10 liters/min., 12 liters/min., and 15 liters/min. The kitchen remote control unit 36 also includes an indicator panel 85 disposed adjacent to the flow rate presetting knob 84 and indicating preset flow rates based on combinations of seasons and water heater unit types. The user can manually turn the flow rate presetting knob 84 with reference to the indicator panel 85.

FIG. 14 shows in block form a control system of the automatic hot water supply apparatus according to the third embodiment of the present invention. The controller 33 is similar to the controller 33 shown in FIG. 6 except that a preset signal from the flow rate presetting knob 84 is read and compared with the flow rate detected by the flow rate sensor 52, depending on the setting by the bathtub switches 61, 71, the washing area faucet switch 62, the hand-held shower switch 63, and the fixed shower switch 64, thus producing signals to be applied to the regulators 79, 80. The Controller 33 does not include the flow rate determining unit 76 shown in FIG. 6.

The automatic hot water supply apparatus of the third embodiment operates as follows:

One of the bathtub switch 61, the washing area faucet switch 62, the hand-held shower switch 63, and the fixed shower switch 64 is depressed to start supplying hot water to a desired tap location at an instructed flow rate and temperature. The flow rate of hot water which is supplied at this time is determined in advance by the flow rate presetting knob 84 which has been turned by the user with reference to the indicator panel 85. The preset value from the flow rate presetting knob 84 is compared with the flow rate detected by the flow rate sensor 52, and the DC motor 56 or 56′ for the flow rate/directional control valve 27 or 28 is controlled to control the flow rate of hot water. A flow rate may be preset by the flow rate presetting knob 84 and then varied by the high rate switch 68 or the low rate switch 69. At this time, the flow rate may deviate from the flow rate indications on the indicator panel 85, but it is possible to meet the user's specific demands for greater emphasis on the flow rate than on the temperature, and for a reduction in the flow rate.

The indicator panel 85 contains the indications of the seasons which represent different water temperatures and the types of instantaneous water heater units which indicate water heater unit capabilities.

The flow rates indicated o the indicator panel 85 are selected with some margins such that desired flow rates can be obtained even when the water temperature and the water heating capacity of the water heater unit vary slightly. When a preset hot water temperature cannot be achieved under extreme conditions, the difference between the temperature detected by the temperature sensor 51 and the preset hot water temperature is detected, and if the error determining unit 77 determines that the difference is not eliminated within a predetermined period of time, then the controller 33 reduces the flow rate.

Varying the flow rate depending on the season and the water heater unit capability is effective to prevent the burner 20 (FIG. 2) from being frequently turned on and off due to a reduction in the amount of water supplied to the instantaneous water heater unit 15 when the preset temperature is low during the summer, and hence to keep the water heater unit 51 durable and also to prevent the mixed hot water temperature from varying slightly.

According to the third embodiment, hot water is supplied to a desired tap location by the electric actuator means in response to operation of the tap location setting unit. Therefore, it is easy to operate the automatic hot water supply apparatus. Under normal conditions in which the flow rate of hot water can be set by the presetting knob 84 with reference to the indicator panel 85, a desired flow rate can immediately be obtained without flow rate regulations. Since the flow rate can be preset by the presetting knob 84 to a proper flow rate range matching the capability of a water heater unit used, any time or hot water is not wasted for flow rate regulations after hot water has started to be supplied. The indicator panel 85 allows the user to preset an adequate flow rate easily and efficiently with the flow rate presetting knob 84.

Figure 15:
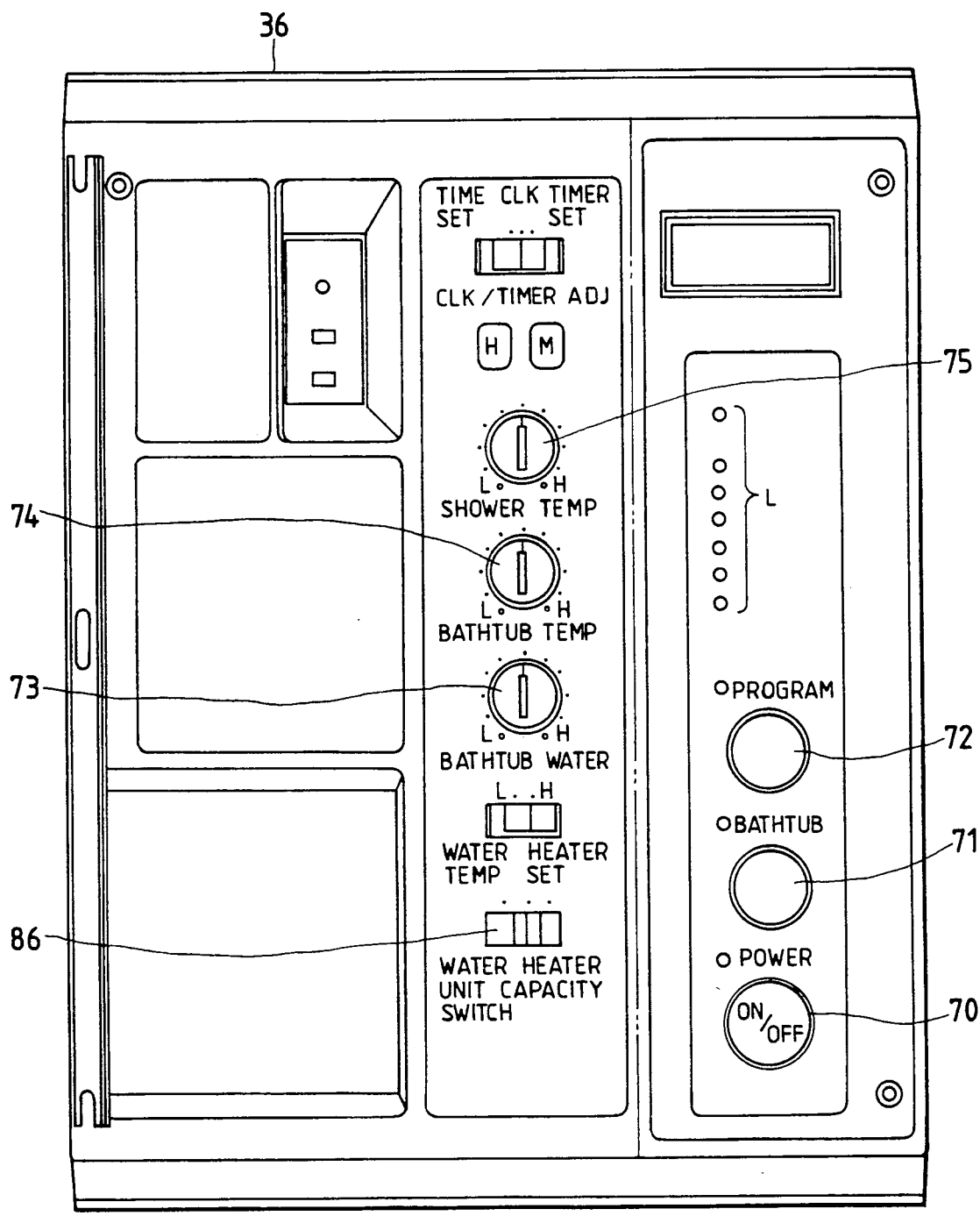
FIG. 15 is a front elevational view of a kitchen remote control unit of an automatic hot water supply apparatus according to a fourth embodiment of the present invention.

FIGS. 15 through 20 show an automatic hot water supply apparatus according to a fourth embodiment of the present invention. FIG. 15 shows a kitchen remote control unit 36 which is different from those of the preceding embodiments in that it contains an instantaneous water heater unit capacity switch 86 for setting the capacity of an instantaneous water heater unit used in combination with the automatic hot water supply apparatus.

Figure 16:
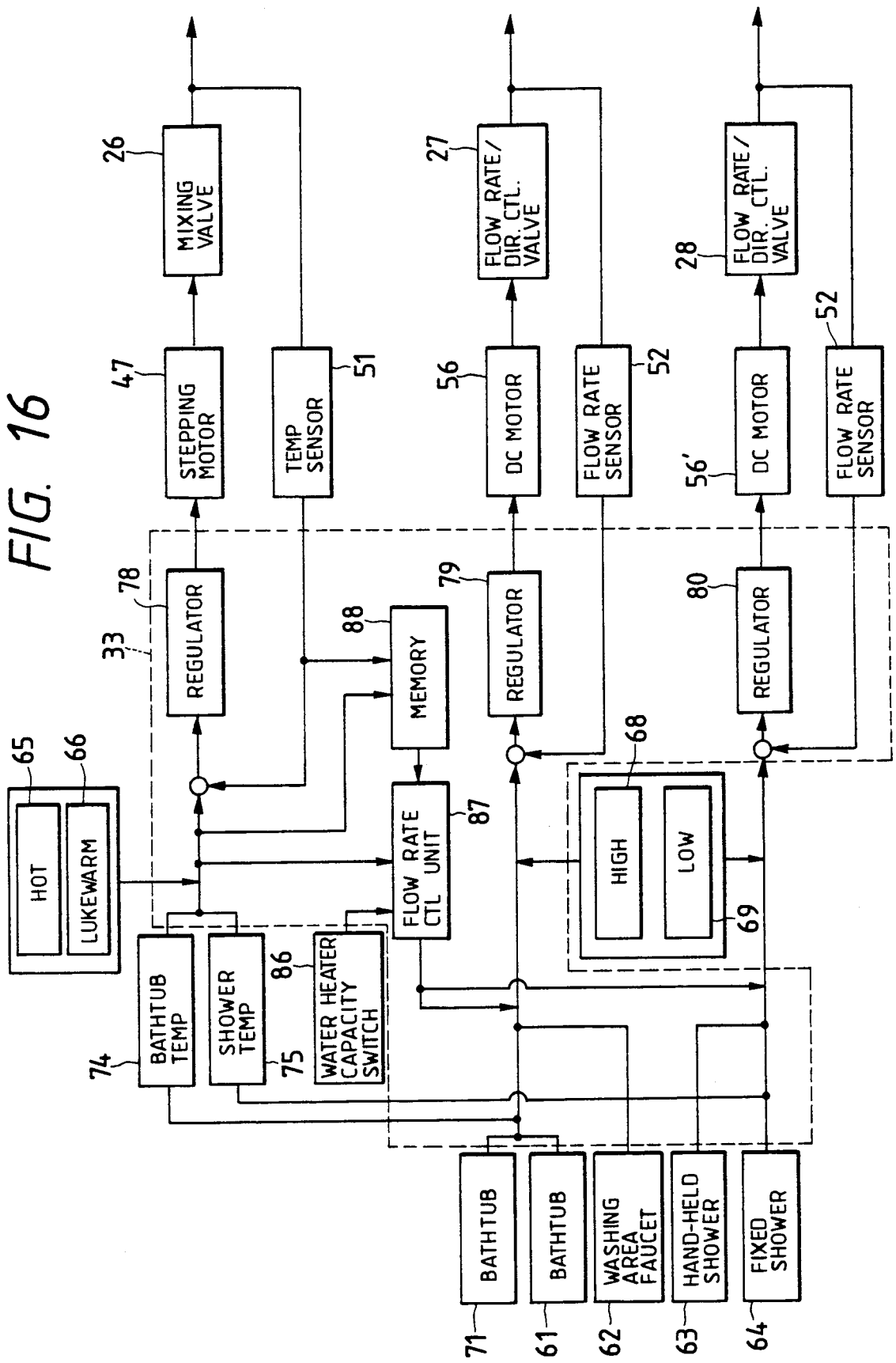
FIG. 16 is a block diagram of a control system of the apparatus of the fourth embodiment.
Figure 17:
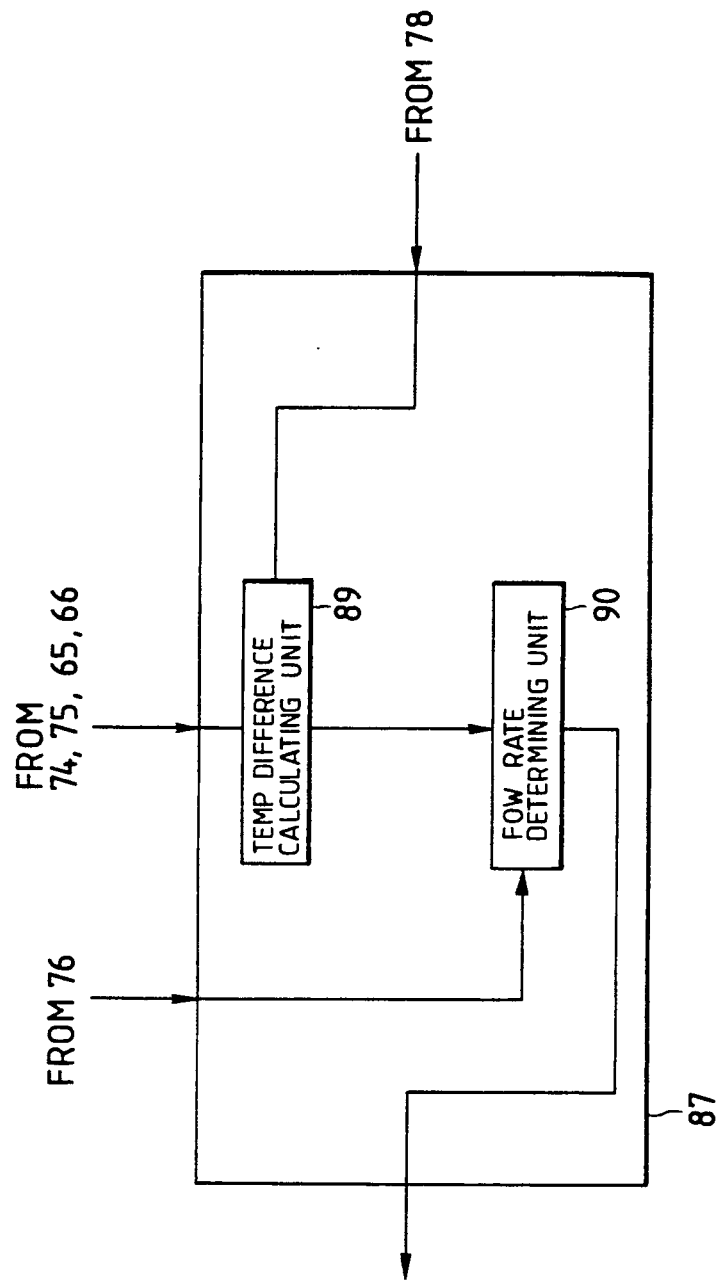
FIG. 17 is a block diagram of a flow rate control unit in the control system shown in FIG. 16.

FIG. 16 shows in block form a control system of the automatic hot water supply apparatus of the fourth embodiment. The controller 33 includes a flow rate control unit 87 and a memory 88 for storing a water temperature detected by the temperature sensor 51 when the preset water temperature indicates cold water. The controller 33 also has the regulators 78, 79, 80. The flow rate control unit 87 is supplied with signals form the bathtub temperature setting knob 74 and the shower temperature setting unit 75, or signals form the hot water switch 65 and the lukewarm water switch 66, indicating temperatures changed from the preset temperatures. The flow rate control unit 87 is also supplied with signals form the instantaneous water heater unit capacity switch 86, and the memory 88. The flow rate control unit 87 produces a hot water flow rate signal.

The flow rate control unit 87 is shown in detail in FIG. 18. The flow rate control unit 87 includes a temperature difference calculating unit 89 for calculating the difference between a preset hot water temperature and a cold water temperature, and a flow rate determining unit 90 for determining the flow rate at which hot water is to be supplied, according to a table shown in FIG. 18.

Operation of the automatic hot water supply apparatus of the fourth embodiment will be described below.

One of the bathtub switch 61, the washing area faucet switch 62, the hand-held shower switch 63, and the fixed shower switch 64 is depressed to start supplying hot water to a desired tap location at an instructed flow rate and temperature. The flow rate of hot water which is supplied at this time is determined as shown in FIG. 18 based on the relationship between the difference between the preset hot water temperature and the cold water temperature and the water heater unit capability. For example, if the preset hot water temperature is 40° C., the cold water temperature is 20° C., the instantaneous water heater unit 15 is of the Type 16, and the water heater unit capacity switch 86 is set to the Type 16, then hot water starts being supplied at an initial flow rate of 15 liters/min. This flow rate is achieved by comparing the signal form the flow rate sensor 52 and the output signal from the flow rate control unit 87, and controlling the flow rate/directional control valve 27 or 28.

The relationship between the hot water supplying capability required of an instantaneous water heater unit, the temperature of water supplied to the water heater unit, the temperature of hot water supplied form the water heater unit, and the flow rate at which hot water is supplied from the water heater unit, is given by:

$$\text{The hot water supplying capability} = \text{Constant} \times \text{Flow rate} \times (\text{Hot water temperature} - \text{Water temperature})$$

The flow rate can accurately be determined if the other three parameters are known. Even if two out of the three parameters or conditions are known, a flow rate can be set to an approximate range more accurately than would be if no information were available at all as is the case with the conventional apparatus. Even with only the hot water temperature being known as one parameter, an appropriate flow rate range can be determined more easily than would be if the other three parameters were not known.

FIG. 19 is a schematic diagram based on the above equation. If the instantaneous water heater unit has a larger capability, then higher-temperature hot water can be produced even when the temperature of cold water supplied to the water heater unit is low. Conversely, if the water heater unit is lower in capability, then it is impossible to produce higher-temperature hot water when the temperature of supplied cold water is low. The water governor 18 (FIG. 2) in the gas-burned instantaneous water heater unit 15 is used to mechanically prevent water from flowing excessively into the heat exchanger 19. Therefore, the flow rates of different types of instantaneous water heater units have different upper limits as shown in FIG. 19. It can be seen from FIG. 19 that it is impossible to produce higher-temperature hot water when the temperature of cold water supplied to the water heater unit 15 is lower. The fourth embodiment of the present invention provides one process for solving such a problem.

The flow rates indicated in the flow rate control table shown in FIG. 18 are selected with some margins such that desired flow rates can be obtained even when the water temperature and the water heating capacity of the water heater unit vary slightly. When a preset hot water temperature cannot be achieved under extreme conditions, the difference between the temperature detected by the temperature sensor 51 and the preset hot water temperature is detected, and if it is determined that the difference is not eliminated within a predetermined period of time, then the controller 33 reduces the flow rate. Varying the flow rate depending on the preset temperature is effective to prevent the burner 20 (FIG. 2) from being frequently turned on and off due to a reduction in the amount of water supplied to the instantaneous water heater unit 15 when the preset temperature is low during the summer, and hence to keep the water heater unit 15 durable and also to prevent the mixed hot water temperature from varying.

FIG. 20 shows a modified flow rate control table in which flow rates are determined solely depending on preset hot water temperatures.

According to the fourth embodiment, hot water is supplied to a desired tap location by the flow rate control valve actuated by the electric actuator means, and at an appropriate flow rate determined according to the flow rate control table shown in FIG. 18 or 20. Therefore, it is easy to operate the automatic hot water supply apparatus. The automatic hot water supply apparatus can be used easily and efficiently without the problems of not achieving a desired hot water temperature due to the failure of the water heater unit and of varying hot water temperatures and reduced durability which would otherwise be caused if the burner of the water heater unit were frequently turned on and off.

The flow rate can be determined more accurately by relying on at least two out of the three parameters, i.e., the preset hot water temperature, the cold water temperature, and the water heater unit capability, than by relying on one of these three parameters. By relying on two out of the above three parameters, there may be dispensed with parts and circuits for measuring or setting parameters, which would otherwise be required if all the three parameters were relied on. The automatic hot water supply apparatus is therefore practical in design.

In each of the above embodiments, the hot water/cold water mixing valve is electrically controlled it may be manually controlled to vary the mixture ratio, or it may comprise a temperature-sensitive member such as a wax thermosensitive element or a bimetal, or the setting knob of a mixing valve comprising a temperature-sensitive member may be moved by a motor.

The common advantages of the above embodiments are as follows:

(1) Since the rate at which hot water is supplied to a desired tap location is controlled by a flow rate control valve actuated by an electric actuator means, a flow rate required at such a desired tap location can immediately be achieved, and hot water can be supplied and shut off at desired tap locations including a faucet for filling up a bathtub, under remote control.

(2) If an instantaneous water heater unit or a similar water heater unit such as a boiler of a small capacity is used to supply hot water, a flow rate limiting means for preventing a reduction in the hot water temperature due to a failure of the instantaneous water heater unit is employed to regulate the flow rate with a flow rate control valve. Therefore, a desired hot water temperature can be achieved regardless of varying water temperatures in different seasons and of varying instantaneous water heater unit capabilities.

Although certain preferred embodiments have been shown and described, it should be understood that many changes and modifications may be made therein without departing from the scope of the appended claims.

What is claimed is:

1. An automatic hot water supply apparatus comprising:

a cold water/hot water mixing valve for mixing cold water supplied through a cold water supply pipe and hot water supplied from an instantaneous water heater unit through a hot water supply pipe, to form temperature-regulated hot water;

a temperature-regulated hot water supply pipe for supplying the temperature-regulated hot water from said cold water/hot water mixing valve to a tap location;

a temperature-regulated hot water temperature setting unit for setting a temperature for the temperature-regulated hot water;

a temperature-regulated hot water temperature detector disposed in said temperature-regulated hot water supply pipe, for detecting the temperature of the temperature-regulated hot water;

a flow rate control valve for controlling the rate of flow of the temperature regulated hot water;

electric actuator means for actuating said flow rate control valve; and a controller for comparing signals from said temperature-regulated hot water temperature detector and said temperature-regulated hot water temperature setting unit for controlling said cold water/hot water mixing valve, and for detecting a reduction in the temperature of the temperature-regulated hot water temperature detector and controlling said flow rate control valve to reduce the rate of flow to the temperature-regulated hot water when the temperature set by said temperature-regulated hot water temperature setting unit cannot be achieved by said cold water/hot water mixing valve.

2. An automatic hot water supply apparatus comprising:

a cold water/hot water mixing valve for mixing cold water supplied through a cold water supply pipe and hot water supplied from an instantaneous water heater unit through a hot water supply pipe, into temperature-regulated hot water;

a temperature-regulated hot water supply pipe for supplying the temperature-regulated hot water from said cold water/hot water mixing valve to a tap location;

a temperature-regulated hot water temperature setting unit for setting a temperature for the temperature-regulated hot water;

a flow rate control valve for controlling the rate of flow of the temperature-regulated hot water;

electric actuator means for actuating said flow rate control valve;

flow rate limiting means for determining a flow rate at which the temperature-regulated hot water is to flow, based on either one or a combination of the capability of the instantaneous water heater unit, the temperature set by said temperature-regulated hot water temperature setting unit, and an actual or estimated temperature of the cold water such that the rate of flow of the temperature-regulated hot water is either increased or reduced depending on the capability of the instantaneous water heater unit, and/or the temperature set by said temperature-regulated hot water temperature setting unit, and/or the actual or estimated temperature of the cold water supplied through the cold water supply pipe; and a controller for controlling said electric actuator means according to the rate determined by said flow rate limiting mans when the temperature-regulated hot water starts to be supplied.

3. An automatic hot water supply apparatus comprising:

a cold water/hot water mixing valve for mixing cold water supplied through a cold water supply pipe and hot water supplied from an instantaneous water heater unit through a hot water supply pipe, into temperature-regulated hot water;

a temperature-regulated hot water supply pipe for supplying the temperature-regulated hot water from said cold water/hot water mixing valve to a tap location;

a temperature-regulated hot water temperature setting unit for setting a temperature for the temperature-regulated hot water;

a flow rate control valve for controlling the rate of flow of the temperature-regulated hot water;

electric actuator means for actuating said flow rate control valve;

flow rate limiting means for determining a flow rate at which the temperature-regulated hot water is to flow, based on either one or a combination of the capability of the instantaneous water heater unit, the temperature set by said temperature-regulated hot water temperature setting unit, and an actual or estimated temperature of the cold water;

a controller for controlling said electric actuator means according to the rate determined by said flow rate limiting means when the temperature-regulated hot water starts to be supplied; and a tap location setting unit for indicating one, at a time, of a plurality of tap locations, said flow rate limiting means comprising means for determining the flow rate at which the temperature-regulated hot water is to flow, based on the tap location indicated by said tap location setting and the temperature set by said temperature-regulated hot water temperature setting unit.

4. An automatic hot water supply apparatus according to claim 3, wherein said flow rate limiting means comprises a memory for storing flow rates determined by said tap location setting unit and temperatures set by said temperature-regulated hot water temperature setting unit.

5. An automatic hot water supply apparatus comprising:

a cold water/hot water mixing valve for mixing cold water supplied through a cold water supply pipe and hot water supplied from an instantaneous water heater unit through a hot water supply pipe, into temperature-regulated hot water;

a temperature-regulated hot water supply pipe for supplying the temperature-regulated hot water from said cold water/hot water mixing valve to a tap location;

a temperature-regulated to water temperature setting unit for setting a temperature for the temperature-regulated hot water;

a flow rate control valve for controlling the rate of flow of the temperature-regulated hot water;

electric actuator means or actuating said flow rate control valve;

flow rate limiting means for determining a flow rate at which the temperature-regulated hot water is to flow, based on either one or a combination of the capability of the instantaneous water heater unit, the temperature set by said temperature-regulated hot water temperature setting unit, and an actual or estimated temperature of the cold water, said flow rate limiting means comprising a season setting unit for setting a season dependent on which the temperature of the cold water is estimated; and a controller for controlling said electric actuator means according to the rate determined by said flow rate limiting means when the temperature-regulated hot water starts to be supplied.

6. An automatic hot water supply apparatus comprising:

a cold water/hot water mixing valve for mixing cold water supplied through a cold water supply pipe and hot water supplied from an instantaneous water heater unit through a hot water supply pipe, into temperature-regulated hot water;

a temperature-regulated hot water supply pipe for supplying the temperature-regulated hot water from said cold water/hot water mixing valve to a tap location;

a temperature-regulated hot water temperature setting unit for setting a temperature for the temperature-regulated hot water;

a flow rate control valve for controlling the rate of flow of the temperature-regulated hot water;

electric actuator means for actuating said flow rate control valve;

flow rate limiting means for determining a flow rate at which the temperature-regulated hot water is to flow, based on either one or a combination of the capability of the instantaneous water heater unit, the temperature set by said temperature-regulated hot water temperature setting unit, and an actual or estimated temperature of the cold water;

a controller for controlling said electric actuator means according to the rate determined by said flow rate limiting means when the temperature-regulated hot water starts to be supplied; and an indicator panel indicating instantaneous water heater unit capabilities and seasons, said flow rate limiting means comprising manually operable means for setting the flow rate at which the temperature-regulated hot water is to flow, according to the instantaneous water heater unit capabilities and seasons indicated by said indicator panel.

7. An automatic hot water supply apparatus comprising:

a cold water/hot water mixing valve for mixing cold water supplied through a cold water supply pipe and hot water supplied from an instantaneous water heater unit through a hot water supply pipe, into temperature-regulated hot water;

a temperature-regulated hot water supply pipe for supplying the temperature-regulated hot water from said cold water/hot water mixing valve to a tap location;

a temperature-regulated hot water temperature setting unit for setting a temperature for the temperature-regulated hot water;

a flow rate control valve for controlling the rate of flow of the temperature-regulated hot water;

electric actuator means for actuating said flow rate control valve;

flow rate limiting means for determining a flow rate at which the temperature-regulated hot water is to flow, based on either one or a combination of the capability of the instantaneous water heater unit, the temperature set by said temperature-regulated hot water temperature setting unit, and an actual or estimated temperature of the cold water, said flow rate limiting means comprises a flow rate table containing flow rates at which the temperature-regulated hot water is to flow, and means for selecting one of said flow rates contained in said flow rate control table base don a combination of at least two of the capability of the instantaneous water heater unit, the temperature set by sad temperature-regulated hot water temperature setting unit, and the temperature of the cold water; and a controller for controlling said electric actuator means according to the rate determined by said flow rate limiting means when the temperature-regulated hot water starts to be supplied.

* * * * *